Dec. 12, 1933.                R. T. MEYER                1,938,922
                         GASOLINE DISPENSING PUMP
                          Filed July 26, 1932           5 Sheets-Sheet 1
Fig. 1.
Fig. 3.
Fig. 2.
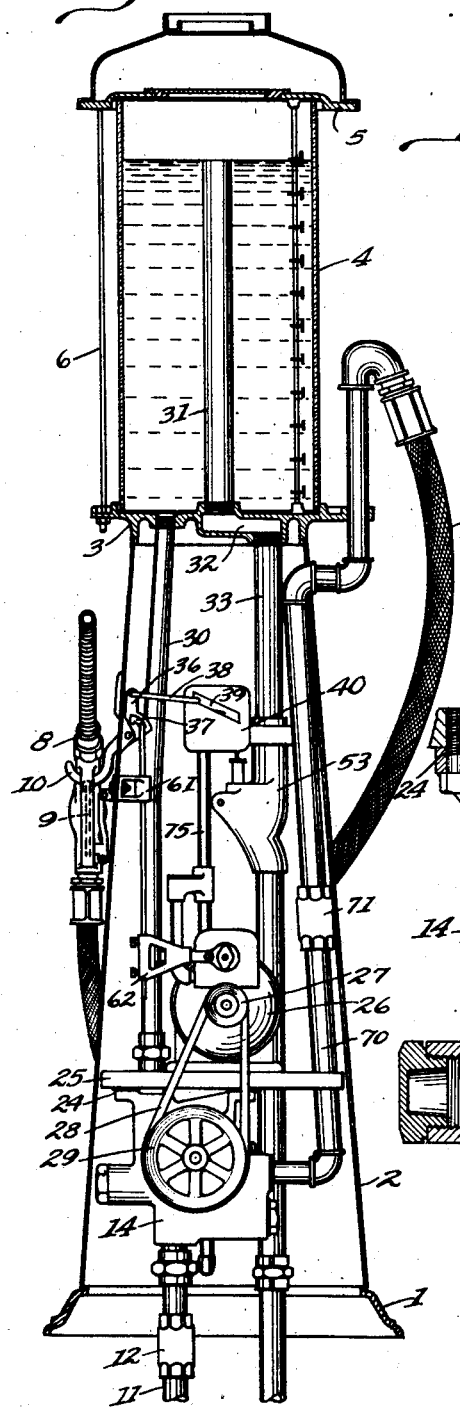
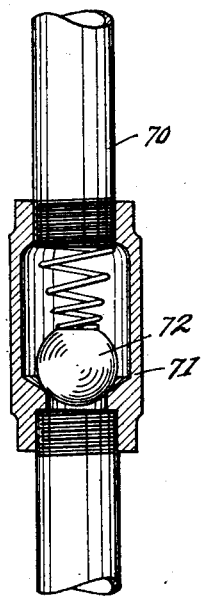
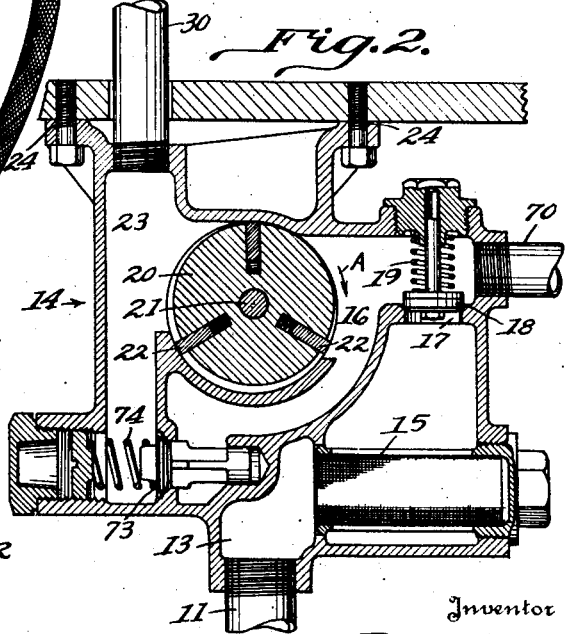
Inventor
R. T. Meyer
By W. S. M. Howell
Attorney Dec. 12, 1933.   R. T. MEYER   1,938,922

GASOLINE DISPENSING PUMP

Filed July 26, 1932   5 Sheets-Sheet 3

Inventor
R.T.Meyer

By
W.S.McDowell
Attorney

Dec. 12, 1933.    R. T. MEYER    1,938,922
GASOLINE DISPENSING PUMP
Filed July 26, 1932    5 Sheets-Sheet 4
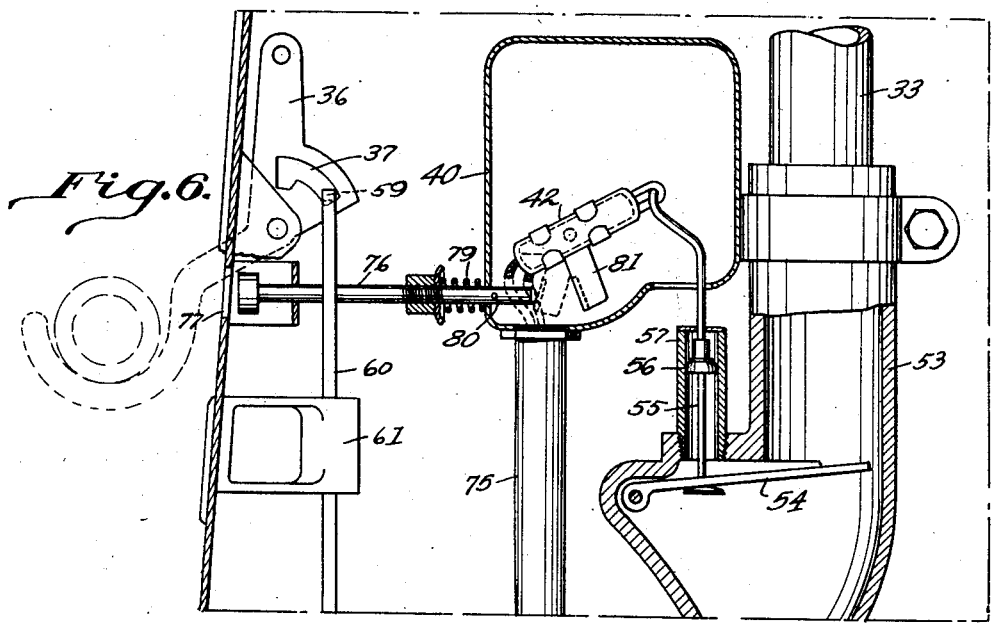
Fig. 6.
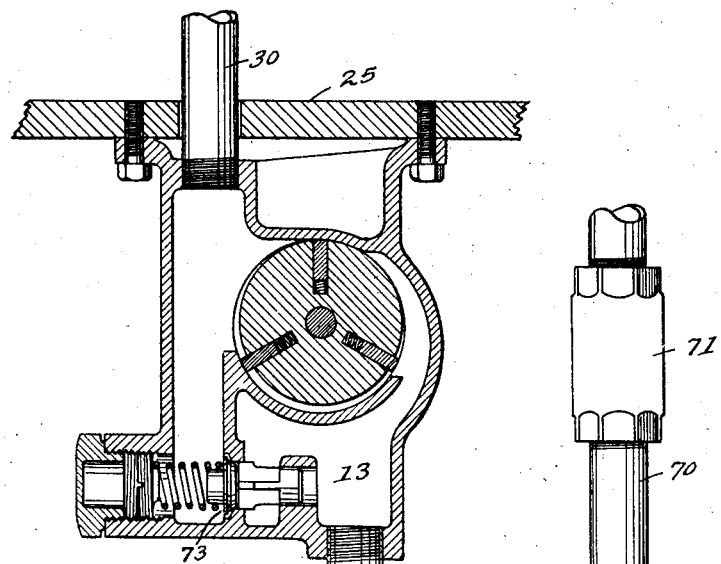
Fig. 7.
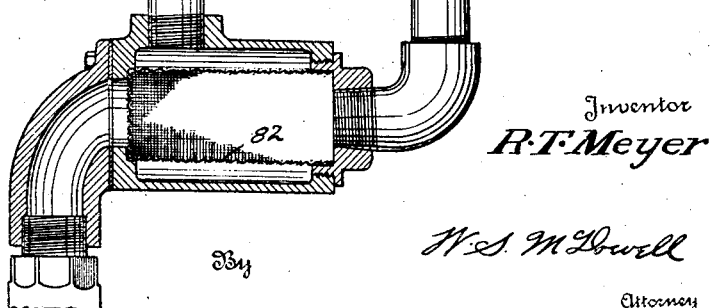
Inventor
R. T. Meyer
By H. S. McDowell
Attorney Patented Dec. 12, 1933

1,938,922

UNITED STATES PATENT OFFICE 1,938,922

GASOLINE DISPENSING PUMP

Richard T. Meyer, Chicago, Ill., assignor to The Pure Oil Company, Chicago, Ill., a corporation of Ohio Application July 26, 1932. Serial No. 624,786

10 Claims. (Cl. 221—100)

This invention relates to improvements in fluid measuring and dispensing apparatus and is particularly directed to improved pumping mechanism for effecting the measured flow of liquid motor fuels from storage containers into the fuel tanks of motor vehicles.

Gasoline dispensing pumps now in general use comprise two well accepted types, the first being the so-called visible type of pump which involves a graduated glass container supported near the top of an upright pedestal, in which latter is housed the pumping mechanism proper employed in raising the liquid from an underground storage tank to the elevated container, the transparent walls of the container admitting of ready observation of the quantity of liquid disposed therein, there being a valved outlet hose line leading from the bottom of the container to facilitate the transfer of the liquid by gravity flow from the container to a vehicle tank. This visible type of dispensing pump, while providing many desirable features, is objectionable in certain respects, which reside chiefly in its relatively slow cycle of operation, since the container must be filled to a required degree and then gravity drained in the servicing of each motor vehicle. Also, other objections reside in the excessive height of the pump to obtain the necessary gravity head on the fluid to cause its positive flow, and the difficulties in transmitting the fluid to the tanks of large motor vehicles, such as trucks or motor buses, which are elevated as compared with those of ordinary passenger vehicles. The second type of dispensing pump, generally known as the indicator or wet hose type, employs relatively low casings wherein the pumping mechanism enclosed thereby pump the fluid directly from storage receptacles into the tank of a motor vehicle without involving the use of the elevated glass container. In this type of pump, reliance is placed upon flow meters or the like disposed in the fluid transmitting lines for the purpose of registering through dial type indicators the quantity of fluid delivered to a vehicle in any given operation. These indicator pumps may be operated at high speed since the fluid dispensed thereby is forced under pump pressure through the outlet hose line. This indicator type of pump however does not give the purchaser of motor fuel the assurance of quantity and quality which the visible type produce. In the indicator type of pump, the customer, in order to be assured as to receiving the full quantity of fluid purchased, relies on properly reading the movement of the indicator hand of the pump over a graduated dial, or upon the sound of an audible signal indicating units of measurement, which methods are not conducive generally to a full sense of satisfaction as to the quantity or quality of fluid actually delivered by the pumping apparatus where the purchaser can readily observe both the bulk and appearance of the fluid withdrawn from a transparent walled container. Also, motor fuels are of different grades, and to identify their products, refiners commonly resort to the practice of distinctively coloring such fuels, or in other cases go to considerable expense in rendering them water white and free from discoloration. The indicator pumps are usually equipped with but small gauge glasses by which the color of the gasoline may be noted, but these glasses do not contain a sufficient quantity of the fluid to provide for the desired certainty of visual identification nor do they give any information as to the quantity of fluid dispensed.

It is, therefore, a primary object of the present invention to provide a pump which retains, to a very considerable degree, the advantageous features of both of these well known types of pumps and, also, avoids many of the recognized disadvantages thereof, retaining comparably the speed, compactness and assurance of operation of the indicator type of pump and the features of measurement and visibility of the transparent container type.

In obtaining such new improved features, the present invention provides gasoline dispensing apparatus embodying the transparent walled measuring container supported for cooperation with a reversible pump, whereby the same pump which is used to elevate the liquid from a storage tank to the container is also employed for positively withdrawing the liquid from the container and advancing it under pumping pressures through the valved hose line leading to a vehicle fuel tank, whereby although a visible container is used, yet there is provided a forced discharge under pumping pressures of the fluid from said container. This is in contrast with the previous type of visible container wherein the fluid is discharged by force of gravity and enables the pump to be operated at high speed yet permits the customer to note the bulk and appearance of the liquid actually purchased.

It is another object of the invention to provide an improved pump of simple, positive and efficient construction wherein its operation is rendered largely automatic by the manipulation of valve hose line. In the preferred form of my invention, I employ a reversible electric motor for operating the reversible pump and provide in connection with the circuits of said motor automatic switch means which function to start and stop the pump driven by the motor to govern the quantity of liquid delivered to the visible container and provide cooperative switch means, governed by the overflow of liquid from said container, after the liquid reaches a predetermined level to arrest the operation of the motor and its associated pump mechanism. The switch mechanism also operates upon the removal of the hose line from its supporting hook to provide for the automatic starting of the motor and pump so that upon the opening of the manually operated valve at the end of the hose line, the said pump will function to immediately withdraw liquid from the container and pass the same under pressure through said hose line.

It is a further object of the invention to provide the reversible pump mechanism with a by-pass valve so that when the pump is in operation, as effected automatically by the removal of the hose line from the supporting hook, and prior to the opening of the valve in the outlet end of the hose line, means will be provided for compensating for abnormal pressures caused by the operation of the pump and to relieve such pressures by permitting of the circulation of fluid around and through the pump.

With these and other objects in view which will appear as the description proceeds, the invention consists in the novel features of construction, combinations of elements and arrangements of parts hereinafter fully described and pointed out in the appended claims.

In said drawings:

Fig. 1 is a view in vertical section of the motor fuel measuring and dispensing pump mechanism comprising the present invention;

Fig. 2 is a vertical sectional view on an enlarged scale taken through the pump unit of the mechanism;

Fig. 3 is a detailed view of a check valve used in the inlet side of the pump unit and also in the discharge conduit leading to the hose line of the pumping apparatus;

Fig. 6 is a detailed vertical sectional view of a modified form of my invention wherein a manual control is provided for operating the switch mechanism to close the motor circuit and to effect the operation of the pump unit to fill the visible container with fluid;

Fig. 7 is a modified form of pumping unit;

Figure 4:
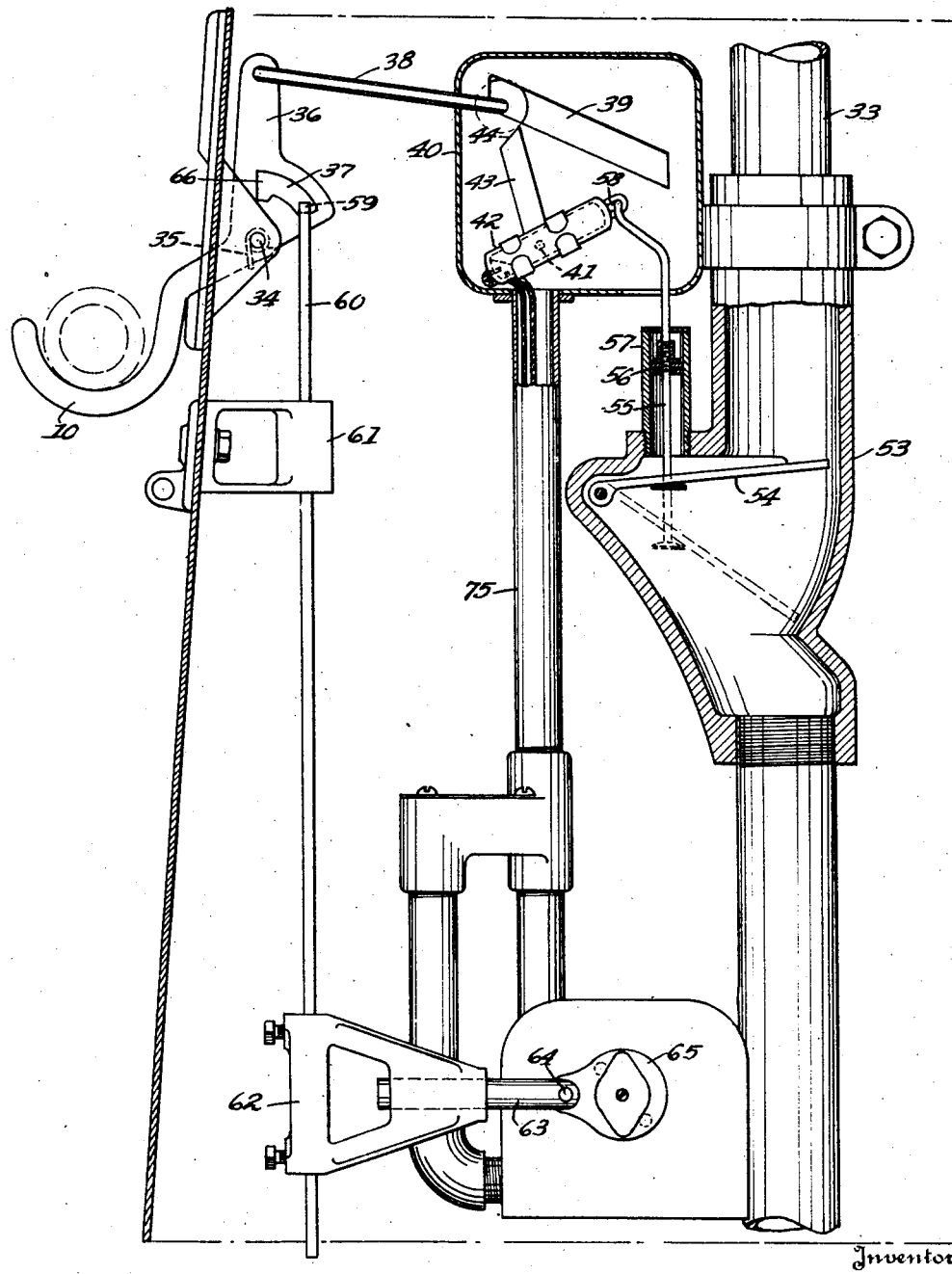
Fig. 4 is a vertical sectional view on an enlarged scale disclosing the switch mechanism in the overflow pipe for arresting the operation of the pump motor when the visible container of the apparatus has been filled with fluid to a desired level. This figure also discloses the position of the movable hook for supporting the hose line when the weight of the latter is applied to the hook.

Referring more particularly to the drawings, and especially to the form of liquid dispensing and measuring apparatus disclosed in Figs. 1 to 5 inclusive, the said apparatus embodies a base casting 1 which supports a slightly tapering casing 2 in the form of a hollow column. Supported upon the upper edge of the casing is the bottom casting 3 of a visible liquid container which preferably partakes of the form of a suitable length of glass tubing, as indicated at 4, the upper end of the tubing being closed by a top casting 5, the castings 3 and 5 and the tubing 4 being rigidly retained in assembled relationship by means of tie rods or the like 6. Liquid to be measured and dispensed is pumped from an underground tank (not shown) or the like into the container 4 and is removed from the latter by way of an outlet conduit of which the flexible hose or tubing 7 constitutes a part, the latter being provided with the usual nozzle 8 which is adapted to be inserted into the fuel tank of a motor vehicle and also, the said nozzle is equipped with a manually operated valve 9 by which the flow of liquid from the hose is readily controlled by the operator. When not in use, the nozzle 8 is received on a movable hook member 10 located on the outside of the pump casing 2. The glass tubing 4 may, if desired, be protected from injury by metallic netting or screens and also, the tubing may be provided with suitable graduations in units of liquid measurement, as is customary in pumps of this type.

Extending from the underground storage tank is a pipe member 11 which is provided with a check valve 12 of the type disclosed, for instance, in Fig. 3, whereby to limit the flow of the liquid in but one direction through the upper part of the pipe member. The upper end of the latter terminates in threaded engagement with the inlet chamber 13 of a rotary and reversible pump 14. In the inlet chamber there is provided a removable screen 15 of appropriate mesh to exclude undesired foreign matter which may be present in the liquid being measured and dispensed. The inlet chamber 13 communicates with the pumping chamber 16 of the pump casing through a port 17. This port is normally closed by means of a valve 18 spring pressed as at 19 to maintain the same in a seated position. Within the pumping chamber, there is mounted a rotor 20 suitably supported by a pump shaft 21 journaled in connection with bearings provided in the pump casing. The rotor is provided, in this instance, with radially disposed slots in which are slidably mounted spring pressed vanes 22. The rotor 20 is mounted slightly eccentrically of the circular walls of the rotor chamber so that the vanes 22 will move radially by contacting with the walls of said chamber during the operation of the pump. While the rotor is revolving in the direction indicated by the arrow A in Fig. 2, liquid is drawn from the underground tank through the pipe member 11, past its check valve 12 and thence into the inlet chamber 13 of the pump casing. The suction or pressure of the pump effects the automatic opening of the valve 18 so that the liquid enters the rotor chamber 16, and is advanced by the operation of the rotor and its vanes 22 into the exhaust chamber 23 of the pump casing.

The upper portion of the pump casing is fastened as at 24 to a horizontal platform 25 upon the upper portion of which is mounted a reversible electric motor 26. The armature shaft of this motor is provided with a pulley 27 around which passes an endless belt 28, the said belt being also trained over a pulley 29 secured to the shaft 21 of the pump rotor. Other forms of motion transmitting devices may be employed but I preferably utilize the reversible electric motor power to the pump and causing the rotation of the pump in a desired direction for the purpose of drawing liquid into the pump or expelling liquid from the pump.

Leading from the exhaust chamber 23 is a conduit 30 which extends upwardly to the bottom casting 3 of the container, whereby when the pump rotor is revolving in the direction indicated by the arrow A, liquid will be withdrawn from the storage tank and delivered to the container, where its quantity and appearance may be exteriorly determined.

Arranged axially in the container 4 is an open ended stand pipe 31 constituting an overflow so that the container when substantially full will receive an arbitrary volume of liquid such for example as five or ten gallons. The lower end of the pipe 31 is threaded into the casting 3 and communicates with a chamber 32 and, also, in communication with this chamber is an overflow return pipe 33, which is housed within the casing 2 and extends back to the storage tank or other source of liquid supply. Within this return pipe there is arranged a switch operating mechanism, as shown in Fig. 4, by which the operation of the motor 26 may be automatically controlled for the purpose of arresting the operation of the pump when the container 4 has been filled to its desired capacity with liquid.

In governing the operation of the motor 26 and the pump 14, it will be assumed that liquid has been withdrawn from the container 4 following delivery thereof to a motor vehicle and that the container has been emptied and the nozzle of the discharge hose 7 replaced on the hook member 10. As shown in Fig. 4, this hook member is pivotally mounted as at 34 on the inside of the casing 2 and the weight of the nozzle 8 on said hook member retains the same in the lowered position set forth in Fig. 4 against the resistance of a coil spring 35 surrounding the pivot 34. The inner end of the hook member is provided with a crank extension 36 formed with an arcuate slot 37 having as its center the pivot 34. The outer end of the crank extension is provided with a bail 38 which is movably mounted in an inclined slot 39 formed in connection with a switch casing 40. Within this casing there is pivotally mounted as at 41 a mercury switch 42, the latter being provided with a crank 43 having a beveled upper edge 44.

The replacing of the nozzle 8 on the hook member 10 rocks the latter to the lowered position disclosed in Fig. 4, thereby drawing the bail member longitudinally of the slot 39, so that the forward edge of the crank 43 is engaged so that the switch 42 will be rocked to assume the position disclosed in Fig. 4 wherein a primary motor circuit is closed. This primary circuit has been set forth in Fig. 8 wherein the trunk leads are indicated at 45 and 46. Current may pass from the lead 45 through a wire 47 and thence through a lead 48 to one of the stationary contacts formed at one end of the switch 42. A wire 49 leads from the other adjacent contact of the switch 42 to the pole member 50 of the motor 26. After passing through the field of the motor, the current is delivered to a return pole member 51 and travels by way of a wire 52 to the return lead 46. This results in exciting the motor to cause its rotation in a direction by which the rotor 20 is revolved as disclosed by the arrow A in Fig. 2, so that liquid will be withdrawn from a storage tank or other source of supply and forced by the pump 14 to the container 4.

After the container has been filled to the height of the stand pipe 33, it is of course desirable to arrest further operation of the pump or motor in the matter of filling the container. This is accomplished by providing the return pipe 33 with a fitting 53. In this fitting there is arranged a pivotally mounted arm 54 which may be moved from the full line position, disclosed in Fig. 4, to the dotted line position by the weight of the liquid above the arm 54 and which is overflowing from the container 4. The weight of this overflowing liquid presses on the arm 54 and moves the latter downwardly, carrying with it a stem 55, which is provided with a piston 56 arranged for regulated movement in a check cylinder 57, the said piston and cylinder providing for a regulated movement of the arm 54 and its retention in desired positions. The upper end of the stem 55, above said cylinder, passes into the switch casing 40 and is connected through a slot 58 with one end of the mercury switch 42. When the arm 54 has been moved downwardly to the dotted line position shown in Fig. 4, the switch 42 is rocked about its pivot 41 so that it will assume the full line position disclosed in Fig. 5. The rocking of the switch 42 causes the mercury content thereof to move out of engagement with the contacts associated with the leads 48 and 49 so that the primary motor circuit will be interrupted, thereby arresting the operation of the motor 26 and the pump 14 and stopping the delivery of liquid to the container 4. In this manner, the container will be filled with liquid after each successive operation of the apparatus.

Figure 5:
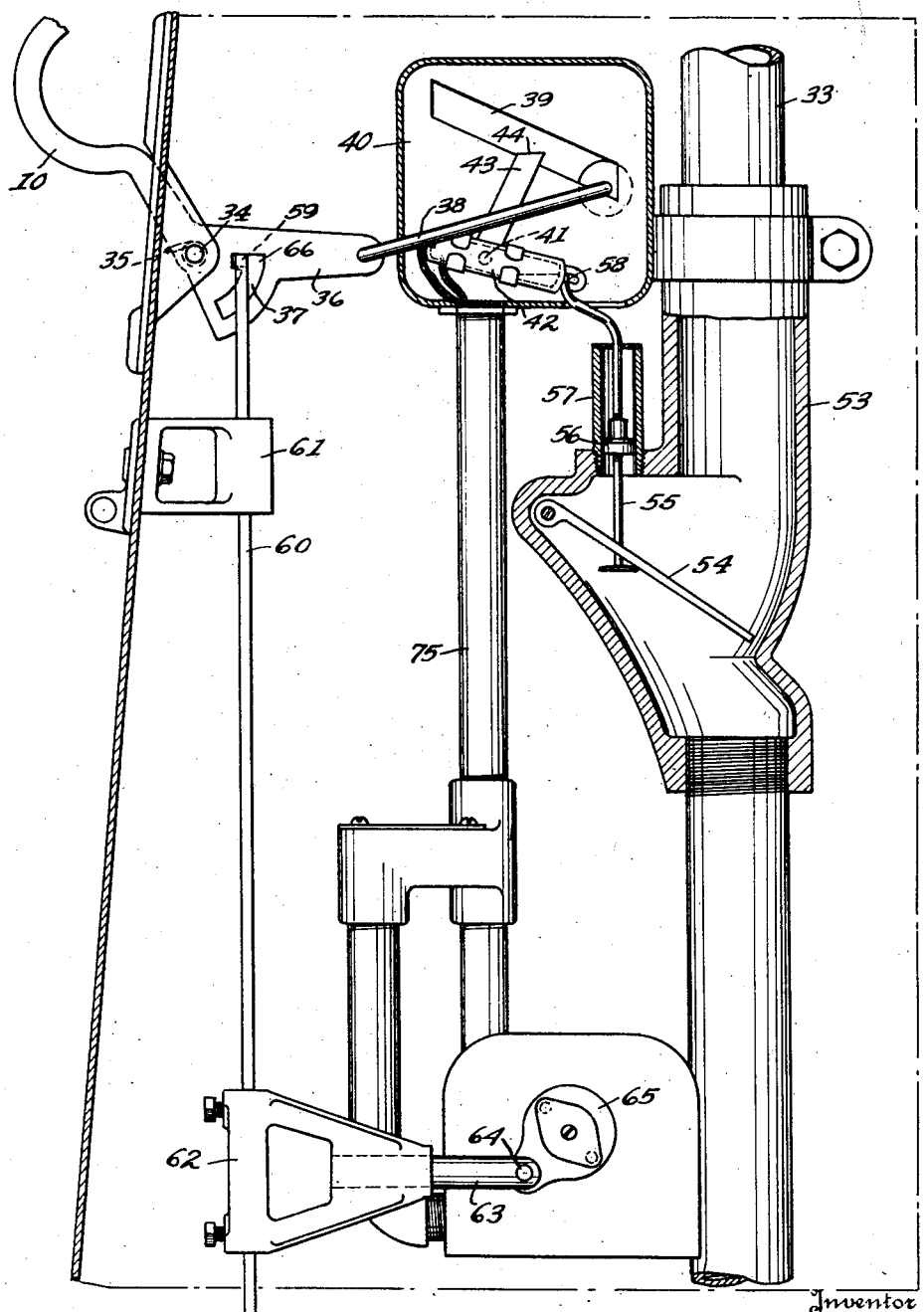
Fig. 5 is a view similar to Fig. 4 illustrating the switch in the overflow line in its lower position arresting the operation of the pump motor and disclosing the movable hook when released by the weight of the hose line and in its upper position.

When it is desired to discharge the contents of the container 4 into the fuel tank of a motor vehicle, the nozzle 8 is removed from the hook member 10 with the result that the said hook member responds to the action of the spring 35 and assumes the elevated position disclosed in Fig. 5, since the said hook member is relieved of the weight of the nozzle and the discharge hose 7. This oscillatory movement of the hook member swings its crank extension 36 so that the bail 38 will be moved downwardly of the slot 39 in the switch casing 40. This downward movement of the bail does not effect the circuit opening position of the switch 42 as shown in full lines in Fig. 5, since the upper end of the crank 43 is beveled as at 44, and which allows the bail member to ride over the upper end of the crank 43 without interfering with the circuit opening position of the switch 42. This upward rotary movement of the hook member 10 is employed to reverse the polarity of the motor 26 and to close a secondary circuit exciting the motor 26 so that the liquid within the container 4 may be discharged through the hose line under pressure. Thus, the crank extension 36 is formed with the segmental slot 37 in which is received the offset upper end 59 of a rod 60. This rod is slidably mounted in a bearing 61 positioned within the casing 2, and the lower end of said rod is connected with a bracket 62. This bracket is provided with a socket in which is slidably positioned a link 63 which has its outer end pivotally connected as at 64 with a rotary motor switch 65.

Figure 8:
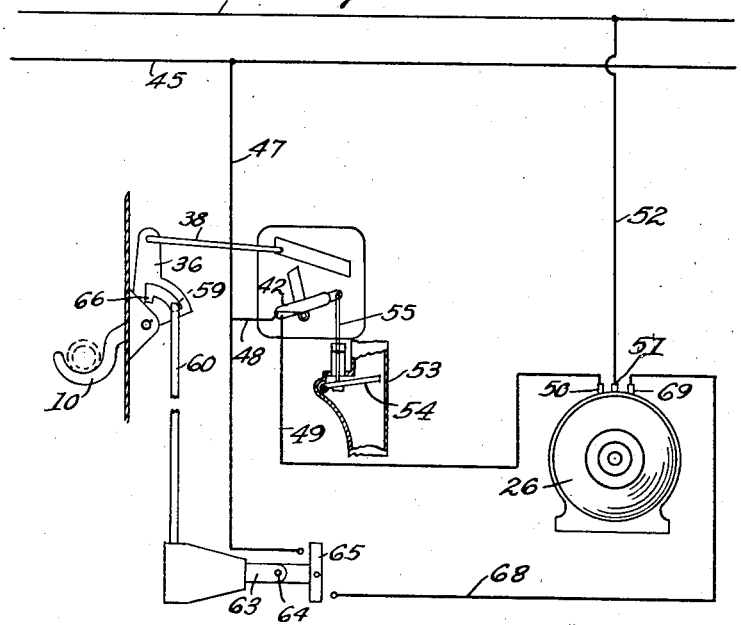
Fig. 8 is a diagrammatic view disclosing the circuits and controlling devices therefor for governing the operation of the pump motor as employed in the preferred form of my invention.

By reference to Fig. 8, it will be noted that when the crank extension 36 swings downwardly and the offset end 59 of the rod 60 engages with the locking recess 66 in one end of the slot 37, the switch 65 is thereby operated to bridge normally spaced contacts, permitting of the flow of current through the lead 47, thence through the closed switch 65 and through a conduit 68 to a third pole member 69 so that the flow of current through the motor windings will be in reverse order to that step by the primary circuit governed by the switch 42, the return of the secondary circuit being through the wire 52 to the trunk lead 46.

Assuming that the valve 9 at the end of the nozzle is open, the closing of the secondary motor circuit reverses the direction of rotation of the rotor 20 so that it will revolve counter clockwise. This results in the withdrawal of liquid from the container 4 and its passage by way of the conduit 30 through the rotor chamber and thence to a delivery pipe 70 communicating with the pump casing adjacent to the valve 18, which remains closed by the pressure of liquid thereon so that the liquid can not enter the pump chamber 13. The delivery pipe 70 is provided with a check valve 71 formed to include a spring pressed ball 72, as shown in Fig. 3, and the upper end of the pipe 70 extends exteriorly of the casing 2 and is connected with the discharge hose 7. Thus the mere removal of the nozzle 8 from the hook member 10 effects the starting of the electric motor in a reverse direction from that used in the filling of the container and renders the same pump available for discharging liquid under pressure from the container. In the event the valve 9 of the nozzle were not open, following the removal of the nozzle from the hook member, injury to the pump mechanism is prevented by the provision of the by-pass valve 73 shown in Fig. 2. Normally, this by-pass valve is closed by the action of a starting spring 74 but it will be seen that in the event liquid flow through the discharge pipe 70 were restricted, the resulting pressures would cause the opening of the valve 73 to provide for the harmless circulation of liquid through the chambers of the pump until the restriction were removed. By this arrangement, the pump 14 serves in the dual capacity of filling the container 4 from an underground storage tank and also operates to effect a pumped discharge of the fluid from the container to outside points. The restoration of the nozzle to the hook member, following the desired discharge of fluid from the container 4, rocks said hook member to the position disclosed in Fig. 4, thereby opening the switch 65 and also, through the bail 38, operates the mercury switch 42 to cause the latter to move to a position of closure for the primary circuit of the motor, thus completing the cycle of operation of the apparatus.

A metallic tubing 75 is used in effecting the support of the switch casing 40 from the frame of the motor 26 and also to house the wiring leading to the switch 42. Also the piston 56 by its frictional engagement with the walls of its cylinder retains the switch 42 in its positions of adjustment and assures regularity of its operation. The offset recess in one end of the segmental slot 37 moves the rod 60 immediately upon the lowering of the hook member to open the motor switch 65, as shown more particularly in Fig. 5.

Figure 9:
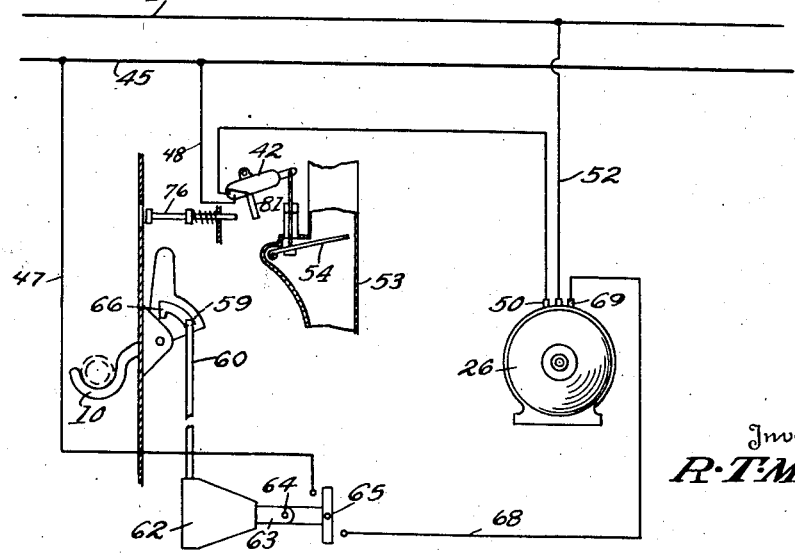
Fig. 9 is a similar view disclosing the wiring diagram for the modified form of the invention disclosed in Fig. 6.

The pump and switch mechanism disclosed provide for substantially complete automatic operation, it being merely necessary to operate the manual valve 9 in effecting and governing the delivery of fluid from the apparatus. If desired, the filling of the container, as shown in Figs. 6 and 9, may be the subject of a manual operation. In this form of my invention, there is provided a push rod 76 having its operating portion disposed in registration with a slot 77 formed in the casing 2. The rod 76 has one end slidably received within the switch casing 40 and is provided intermediately of its length with a nut 78 with which engages a coil spring 79, the latter being mounted around the push rod between the nut 78 and one of the walls of the casing 40, a stop pin 80 being connected with the rod 76 to limit its outward movement in response to the forces supplied thereto by the spring 79. In this form of my invention, the mercury tube comprising the switch 42 includes a depending crank arm 81 adapted for engagement with the inner end of the rod 76. When it is desired to fill the container with fluid, the push rod 76 is manually operated to rock the switch 42 to a position operating the motor to cause the pump to fill the container with fluid. Usually, this can be done by the mere depression of the rod 76 which rocks the switch 42 to a position of circuit closure, the switch being held in that position by the piston 56. When the container has been filled, the overflow therefrom contacts with the arm 54 and restores the switch 42 to a position opening the primary circuit. The secondary circuit of the motor is operated automatically as in the preferred form of the invention previously described.

In Fig. 7, a variation of my invention is disclosed wherein the valve 18 is omitted and a simpler form of pump casing provided. In this form of the invention, the screen member 82 is disposed in a separate casing from the pump proper, otherwise, the construction and operation are identical with that disclosed in Fig. 2.

In view of the foregoing, it will be seen that the present invention provides a visible liquid measuring and dispensing pump mechanism wherein rapidity of operation is provided with a facility comparable with that of the meter or indicator type of pumps but with the added advantage of permitting both the customer and pump operator to determine the quality and quantity of fluid being dispensed. In previous types of the visible pump, using gravity flow from the visible containers to the tanks of motor vehicles, it has been necessary to elevate the pump casing and the container to a considerable height in order to provide for the necessary head of fluid during discharge. By placing the container in such elevated positions, it has been difficult for customers, seated in motor vehicles, as well as the operator, to observe without difficulty the withdrawal of liquid from the visible containers. However, by using the pump discharge of fluid from the containers, the height of the apparatus and the distance of the container above the ground may be very considerably lowered over previous types of visible pumps so that the said container may be observed with ease and without unnecessary effort.

While I have described what I consider to be the preferred embodiments of my invention, nevertheless it will be understood that I do not limit myself to the exact details of construction and operation above set forth, but reserve the right to employ variations or modifications thereof without departing from the spirit of the invention as the latter has been defined in the following claims.

What is claimed is:

1. In fluid measuring and dispensing apparatus, a supporting casing, a liquid receiving and measuring container supported by said casing, said container having substantially transparent walls admitting of the observation of the fluid contents thereof, a reversible pump arranged in said casing and operative to deliver fluid from a source of fluid supply to said container, a discharge conduit leading from said pump for effecting the delivery of fluid under pressure of said pump to be withdrawn from said container for outside delivery, a reversible electric motor for driving said pump, a switch for controlling a primary circuit leading to said motor, an overflow conduit leading from said container to the source of fluid supply, and means operative by the passage of fluid through said overflow conduit to effect the automatic opening of said motor switch.

2. In liquid measuring and dispensing apparatus, a frame structure, a measuring container having transparent walls mounted upon the upper portion of said frame structure, a reversible pump disposed in said frame structure below said container, conduit means uniting said pump with said container providing for the delivery of liquid to said container and the withdrawal of liquid from said container under pressure of said pump, a reversible electric motor for effecting the operation of said pump, and switch means for controlling the operation of said motor in response to the quantity of liquid disposed in said container.

3. In apparatus for measuring and dispensing motor fuels, a frame, a transparent walled container supported by said frame in a relatively elevated position, a reversible pump supported within said frame below said container, means cooperative with said pump for delivering a liquid motor fuel to said container, supplemental means cooperative with said pump for withdrawing motor fuel liquid from said container and transmitting the same under the pressure of said pump to a point of delivery, a reversible electric motor for driving said pump, a primary circuit for said motor, a switch in said primary circuit operable upon closure to effect the operation of said motor in a direction to transmit liquid by way of said pump to said container, a secondary circuit for said motor, and switch mechanism for controlling the closing of said secondary circuit whereby to effect the operation of said motor and pump to expel liquid under the pressure of said pump from said container.

4. In motor fuel dispensing and measuring apparatus, a frame, a transparent walled measuring container mounted on said frame, pump mechanism mounted within said frame below said container and serving to deliver liquid from an underground source of supply to said container, means operable upon the filling of said container to a predetermined level with said liquid to arrest the operation of said pumping mechanism, a discharge line leading from said container and passing through said pumping mechanism, said discharge line terminating in a flexible delivery hose having a valved discharge nozzle at the outer end thereof, a movable support for the nozzle carried by said frame structure, and means for effecting the operation of said pumping mechanism to discharge liquid from said container automatically operable upon the removal of said nozzle from said support.

5. In apparatus for measuring and dispensing motor fuels, a supporting frame, a liquid receiving and measuring container supported by said frame, said container having substantially transparent walls, a single reversible pump mounted within said frame below said container for delivering liquid to and discharging the same from said container, a discharge hose having a valved nozzle at its outer end connected with the liquid discharge outlet of the pumping mechanism leading from said container, an electric motor for operating said pumping mechanism, a circuit for said motor, a switch in said circuit for governing its opening and closure, a support for said nozzle when the latter is inactive, and means operative automatically upon the removal of said nozzle from said support to effect the operation of said switch mechanism.

6. In a liquid measuring and dispensing apparatus, a supporting frame, a liquid receiving and measuring container supported by said frame, said container having substantially transparent walls admitting of the exterior observation of the contents thereof, a reversible pump mounted in said frame below said container, a reversible electric motor for driving said pump, means operable upon the operation of said pump in one direction to transfer liquid from a source of liquid supply to said container, means operable upon the operation of said motor and pump in the reverse direction to withdraw liquid from said container by way of said pump and deliver the same to a discharge conduit, a hose connected with and forming a part of said conduit, a valved nozzle carried by the delivery end of said hose, a movable support carried by said frame for the reception of said nozzle when the latter is inactively positioned, a primary circuit for said motor provided with a pivoted switch, means operable upon the placing of said nozzle on said support to move said switch to a position of circuit closure whereby to close said primary circuit and effect the operation of said motor and pump to deliver liquid to said container, an overflow pump line leading from said container to the source of liquid supply, means disposed in said line to move said pivoted switch automatically to a position opening said primary circuit when said container has been filled with liquid to a predetermined level, a secondary circuit for said motor serving to operate said motor and pump in a reverse direction from said primary circuit, and means operable by the removal of said nozzle from said support to close said primary circuit.

7. In liquid measuring and dispensing apparatus, a supporting frame, a transparent walled liquid receiving and measuring container supported by said frame, a reversible rotary pump arranged in said frame below said container, a reversible electric motor for driving said pump, conduit means communicating with said pump and leading from a source of liquid supply to said container and operable upon the rotation of said pump in one direction to supply said container with liquid, cooperative conduit means communicating with said pump and operable upon the rotation of said pump in reverse direction to withdraw liquid from said container and discharge the same under the pressure of said pump to a point of delivery, a flexible discharge line constituting a part of said last-named conduit means, said flexible discharge line being provided at its outer end with a valved nozzle, a movable support carried by said frame for the reception of said nozzle when the latter is inactively positioned, a primary circuit for said motor, switch means operable upon the placing of said nozzle on said support to close said primary circuit to effect the operation of said motor and pump in a direction to deliver liquid to said container, an overflow conduit leading from said container to the source of fluid supply, means operable upon the passage of liquid through said overflow conduit to effect the operation of said switch to open said primary circuit to arrest delivery of liquid to said container after the latter has been filled with liquid to a predetermined extent, a secondary circuit for said motor operable when closed to operate said motor and pump to effect the discharge of liquid from said container through said pump, and means operable upon the removal of said nozzle from said support to effect the closure of said secondary circuit.

8. In fluid measuring and dispensing apparatus, a supporting frame, a liquid container supported by said frame, a reversible pump for delivering liquid to said container, a reversible motor for operating said pump, a primary circuit governing the motor operation in one direction to fill the container, a secondary circuit governing the motor operation in the other direction to empty the container, a nozzle equipped discharge conduit connected to said container through said pump, a nozzle support, switch means connected for operation with said nozzle support and so arranged as to close the primary circuit when the nozzle is placed on the support and the secondary circuit when the nozzle is removed from the support.

9. In fluid measuring and dispensing apparatus, a liquid receiving and measuring container, a reversible pump for filling and emptying said container, a motor for driving said pump, a nozzle equipped discharge conduit connected through said pump to said container, a nozzle support, a switch for operating said motor to fill said container and an additional switch for operating said motor to empty said container.

10. In fluid measuring and dispensing apparatus, a liquid receiving and measuring container, a reversible pump for alternately filling and emptying said container, a reversible motor for driving said pump, a primary circuit for operating said motor in one direction, a secondary circuit for operating said motor in the opposite direction, a switch for controlling said primary circuit, a second switch for controlling said secondary circuit and switch operating means so arranged as to close the primary circuit simultaneously with the opening of the secondary circuit.

RICHARD T. MEYER.